Figure 1:
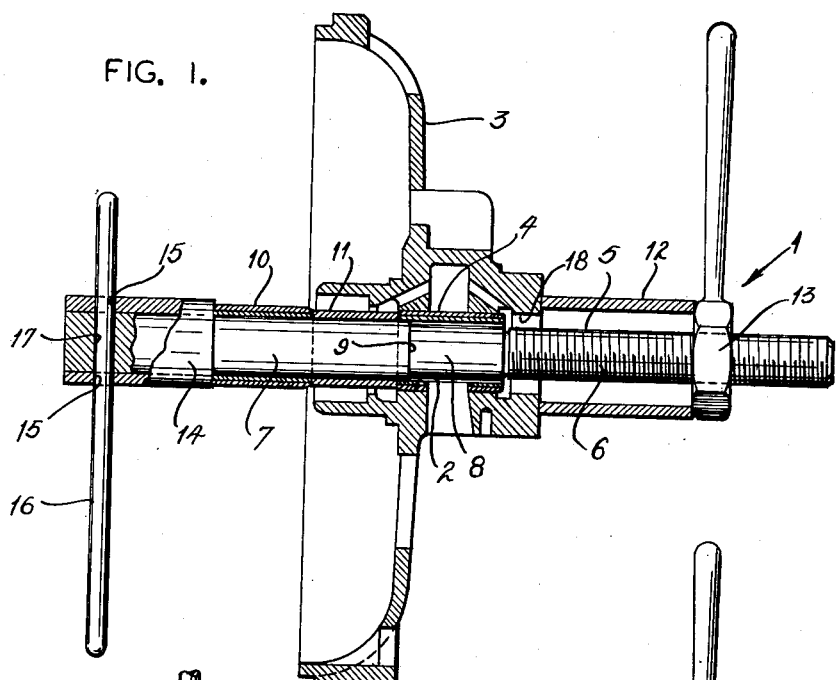

June 15, 1954     W. C. POTTER     2,680,903
BEARING CHANGING TOOL
Filed Jan. 3, 1950

INVENTOR:
Wilfred C. Potter,
by Carr & Carr & Gravely,
HIS ATTORNEYS.

Patented June 15, 1954

2,680,903

UNITED STATES PATENT OFFICE 2,680,903

BEARING CHANGING TOOL

Wilfred C. Potter, Overland, Mo., assignor to Wagner Electric Corporation, St. Louis, Mo., a corporation of Delaware Application January 3, 1950, Serial No. 136,481

2 Claims. (Cl. 29—263)

This invention relates to a tool for removing and installing sleeve type bearings and bushings. The device is particularly adapted for the removal and installation of steel backed babbitt lined sleeve bearings used in motor endplates. This type of bearing consists of a steel jacket having a thin inner surface of babbitt which is usually provided with a slit parallel to the longitudinal axis of the bearing. The bearing unit is machined to its proper inside and outside diameters prior to its installation. Thus, when inserted into the bearing housing of a motor endplate, no additional machining operations are required provided the installation is performed without allowing more than a negligible amount of deformation to the inner surface of the sleeve bearing.

In the past the removal of worn steel backed babbitt lined sleeve bearings and the installation of new bearings presented a difficult problem to servicemen and users of electric motors due to the fact that a sleeve bearing of this type has little mechanical strength before it is properly mounted in the bearing housing of a motor endplate. The difficulty of quickly and correctly installing a new steel backed babbitt lined bearing in the place of a worn sleeve bearing has greatly retarded the commercial acceptance of this type of sleeve bearing. Many devices have been placed on the market as a remedy for this difficulty but none of these devices fulfilled all the requirements. Experience has shown that this bearing changing tool meets all the necessary requirements in servicing a motor.

The principal object of this invention is to provide a tool that will combine the removal of the worn bearing and the installation of the new bearing into one operation.

Another object of this invention is to provide a tool that is capable of maintaining a given bearing surface during installation to eliminate subsequent machining operations.

Another object is to provide a tool that automatically aligns the new bearing during the installation.

Still another object is to provide a bearing tool that will properly locate the new bearing in the bearing housing.

This device comprises a shaft having an abutment thereon, said shaft supporting a new sleeve bearing adapted to be placed in abutting relationship with a sleeve which is in abutting relationship with a worn sleeve bearing.

The invention also consists in the parts and arrangements and in the combination of parts hereinafter described and claimed.

Figure 2:
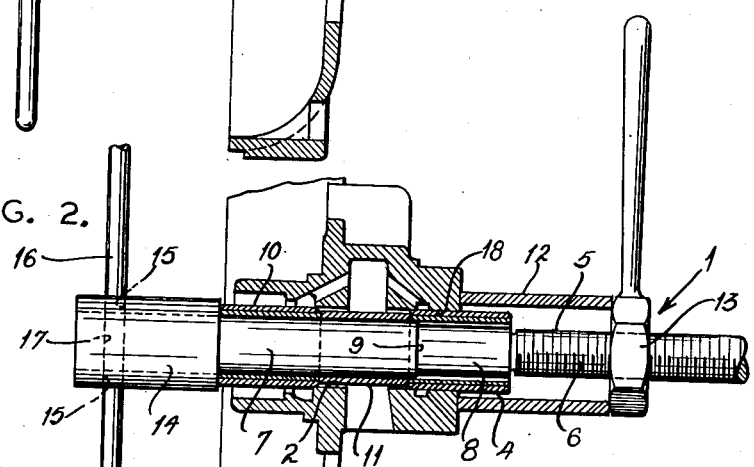
Figure 3:
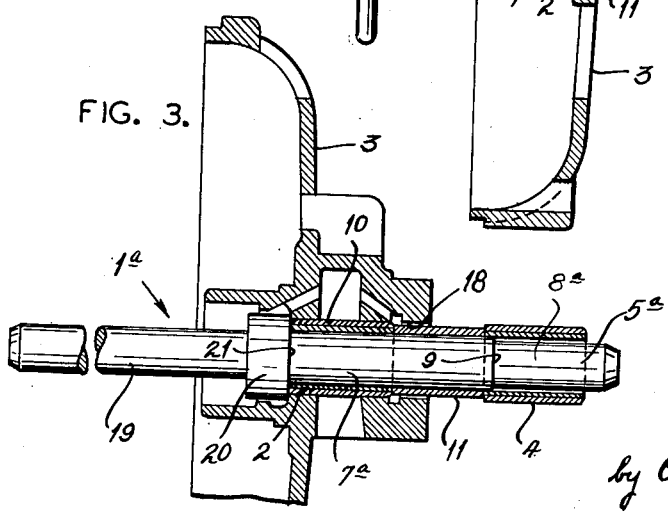

In the accompanying drawings, which form part of this specification and wherein like numerals refer to like parts wherever they occur:

Fig. 1 is a vertical cross-sectional view of my device in assembled relation with a motor endplate whose sleeve bearing is to be replaced, Fig. 2 is a vertical cross-sectional view of my device in assembled relation with the motor endplate after the worn sleeve bearing has been partially removed from the bore of the endplate, and Fig. 3 is a vertical cross-sectional view of a modified form of this device in assembled relation with a motor endplate after the worn sleeve bearing has been removed from and the new sleeve bearing has been inserted into the bore of the motor endplate.

In Fig. 1 the bearing changing tool 1 is shown assembled in the bore 2 of an endplate 3 having a worn sleeve bearing 4 therein which is to be removed. The bearing changing tool 1 comprises a shaft 5 having a threaded surface 6 on one end thereof, a bearing surface 7 on the other end thereof with a reduced surface 8 therebetween, a chamfer 9 being provided at the junction of the bearing surface 7 and the reduced surface 8. The reduced surface 8 has a smaller diameter than the bore diameter of the worn sleeve bearing 4 to be removed. The bearing surface 7 has a diameter which allows the new sleeve bearing 10 to fit snugly thereon. A sleeve 11 is slideably mounted on the bearing surface 7 of the shaft 5 between the new sleeve bearing 10 and the worn sleeve bearing 4. A spacer 12 fits circumferentially over a portion of the threaded surface 6 of the shaft 5 between the end of the endplate 3 and a wrench type nut 13 on said threaded surface 6.

A collar 14 having holes 15 therein is slidably mounted on the bearing surface 7 of the shaft 5 at the end opposite the threaded surface 6 and a pin 16 is dropped through the holes 15 in the collar 14 and a hole 17 in the shaft 5. The length of the sleeve 11 must be shorter than the length of the machined surface 18 in the bore 2 of the endplate 3.

To remove the worn sleeve bearing 4 and install a new sleeve bearing 10 in a single operation, the device hereinbefore described is assembled on an endplate 3 as shown in Fig. 1. To obtain this assembly, the collar 14 is first fitted into place on the bearing surface 7 of the shaft 5 and is secured thereto by inserting a pin 16 into the coinciding holes 15 and 17 in the collar 14 and the shaft 5, respectively. A predetermined portion of the bearing surface 7 remains exposed. The new sleeve bearing 10 which is to be installed has one of its ends cut square with its other end chamfered as shown and is also machined and bored to the exact desired finished outside and inside diameters. This new sleeve bearing 10 is placed over the bearing surface 7 of the shaft 5 with its square cut end contacting the edge of the collar 14. The sleeve 11 is then placed over the bearing surface 7 so that one end of said sleeve 11 contacts the chamfered end of the new sleeve bearing 10. The length of the bearing surface 7 is such that a small portion thereof remains exposed after the collar 14, the new sleeve bearing 10, and the sleeve 11 have been placed thereover. The threaded end of the shaft 5 is then inserted into the bore 2 of the endplate 3 until the edge of sleeve 11 abuts against the worn sleeve bearing 4. The spacer 12 is then placed over the threaded surface 6 of the shaft 5 so that one end thereof abuts against the outside surface of the endplate 3. The wrench type nut 13 is then screwed onto the threaded surface 6 until said wrench type nut 13 abuts against the edge of the spacer 12. Continued rotation of the wrench type nut 13 forces the shaft 5 to move rightwardly with respect to the endplate 3 and causes the worn sleeve bearing 4 to be displaced by the sleeve 11. This is shown in Fig. 2.

Further rotation of the wrench type nut 13 causes the shaft 5 to move further rightwardly whereupon the new sleeve bearing 10 begins to move into the position vacated by the worn sleeve bearing 4, said worn sleeve bearing 4 serving as a guide for the alignment of the new sleeve bearing 10. The machined surface 18, being of a constant diameter, may be of any desired length provided it will properly house and support the new sleeve bearing 10. The new sleeve bearing 10, being previously bored to the proper size, maintains the correct inside diameter by virtue of its support from the bearing surface 7 of the shaft 5. Rotation of the wrench type nut 13 is prevented when the right edge of the collar 14 abuts against the shoulder extending from the left edge of the machined surface 18. When contact is made between the collar 14 and the above shoulder the new sleeve bearing 10 is automatically located in the position vacated by the worn sleeve bearing 4 in the endplate 3.

The shaft 5 may then be removed by one of two methods, depending upon the desire of the user. The quickest and easiest method of removal is to remove the pin 16 and the collar 14. The portion of the bearing surface 7 normally covered by the sleeve 11 being slightly relieved to facilitate removal of the shaft 5, the shaft 5 is pulled rightwardly clear of the new sleeve bearing 10 and the endplate 3 by grasping the wrench type nut 13 and pulling it rightwardly. The worn sleeve bearing 4, by virtue of the reduced surface 8, may be removed with ease. If it is desired to remove the bearing changing tool 1 by a leftward movement, the wrench type nut 13 must be unscrewed from the threaded surface 6 of the shaft 5 thus allowing the spacer 12, the worn sleeve bearing 4 and the sleeve 11 to be removed.

A modified form of the bearing changing tool 1 is shown in Fig. 3. This modified bearing changing tool 1a comprises a shaft 5a having an extended surface 19, an enlarged surface 20 with a shoulder 21 thereon, a bearing surface 7a and a reduced surface 8a. A sleeve 11 fits over the bearing surface 7a between the new sleeve bearing 10 and the worn sleeve bearing 4. The length of the bearing surface 7a is the same as the length of the bearing surface 7 to the right of the collar 14 shown in Fig. 1 and Fig. 2.

To remove the worn sleeve bearing 4 and install a new sleeve bearing 10 in a single operation with this modified bearing changing tool 1a, the new sleeve bearing 10 is first placed on the bearing surface 7a of the shaft 5a with its square cut end contacting the shoulder 21 formed between the enlarged surface 20 and the bearing surface 7a. The sleeve 11, normally having an outside diameter slightly smaller than the outside diameter of the new sleeve bearing 10 and the worn sleeve bearing 4, is then placed over the bearing surface 7a with one end contacting the chamfered end of the new sleeve bearing 10 with a small portion of the bearing surface 7a extending beyond the end of the sleeve 11. The right end of the shaft 5a is then inserted into the bore 2 of the endplate 3. After the exposed portion of the bearing surface 7a enters the worn sleeve bearing 4 the force of a hammer or of an arbor press may be applied to the left end of the shaft 5a moving the shaft 5a rightwardly to the position shown in Fig. 3 thereby replacing the worn sleeve bearing 4 with the new sleeve bearing 10 in one operation. During this operation the bearing surface 7a supports the worn sleeve bearing 4 and aligns the new sleeve bearing 10.

The worn sleeve bearing 4 and the sleeve 11 may then be removed. Removal of the worn sleeve bearing 4 is made easier because of the reduced surface 8a. The shaft 5a can then be removed by lightly tapping the right end thereof.

What I claim is:

1. A bearing changing tool adapted to remove a worn sleeve bearing from the bore of a motor endplate and install a new sleeve bearing therein, said tool comprising a shaft having an enlarged cylindrical portion thereon at one end thereof, a reduced portion at the other end thereof with a cylindrical bearing surface therebetween, said reduced portion being cylindrical and of smaller diameter than the cylindrical bearing surface, a shoulder provided at the junction of said enlarged cylindrical portion and said bearing surface and a chamfer provided on said bearing surface at the junction of said bearing surface and said reduced surface, said new sleeve bearing being supported on said bearing surface and in abutting relation to said shoulder, said shoulder having a portion which extends radially outwardly beyond the outside diameter of said new sleeve bearing, and a sleeve slidably mounted on said bearing surface in abutting relation to said new and worn sleeve bearings, said sleeve having an outside diameter less than the outside diameters of the sleeve bearings.

2. A bearing changing tool according to claim 1, wherein the combined lengths of the new bearing and said sleeve are less than the length of the bearing surface whereby to provide a terminal portion of the bearing surface for entrance into the worn bearing.

References Cited in the file of this patent

UNITED STATES PATENTS

| Number | Name | Date |
|---|---|---|
| 1,736,529 | Goeller | Nov. 19, 1929 |
| 1,824,743 | Nev | Sept. 22, 1931 |
| 1,863,956 | Wilson | June 21, 1932 |
| 1,897,737 | Snarr | Feb. 14, 1933 |
| 2,497,498 | Hamilton | Feb. 14, 1950 |